Nov. 8, 1960 L. L. CUNNINGHAM 2,959,352
FUEL GAS CONTROL SYSTEM
Filed Aug. 13, 1956 2 Sheets-Sheet 1

INVENTOR
Lewis L. Cunningham

BY
AGENT

Nov. 8, 1960

L. L. CUNNINGHAM 2,959,352

FUEL GAS CONTROL SYSTEM

Filed Aug. 13, 1956

INVENTOR
Lewis L. Cunningham

BY

AGENT

United States Patent Office 2,959,352
Patented Nov. 8, 1960

2,959,352

FUEL GAS CONTROL SYSTEM

Lewis L. Cunningham, 119 N. Gordon Way,
Los Altos, Calif.

Filed Aug. 13, 1956, Ser. No. 605,915

2 Claims. (Cl. 236—80)

This invention is an improvement over the invention shown in my U.S. Patent No. 2,524,377, issued October 3, 1950, Burner Control System.

In the preferred form here shown for the practice of my invention there is illustrated and described a modulating main valve for the control of fuel gas supplied to a gas burner for a heater for a space together with alternate methods for modulatingly controlling the main valve in response to the variation in temperature within the space.

It is a primary object of this invention to provide a control system with an improved means for modulatingly controlling the supply of a fluid to a fluid utilization equipment in response to a condition responsive to the utilization of the fuel by the equipment.

It is a second object to provide such a system with an improved main fluid valve mechanism capable of modulatingly controlling a fluid supply when a separately modulated part of said fuel supply is impressed on particular control elements of the mechanism.

It is a third object to provide such a system with such a mechanism having means for positioning its main fluid valve automatically to limit the maximum pressure of the said fuel gas passed by said main fluid valve to said heater.

It is a fourth object to provide such a system with such a mechanism having means for positioning its main fluid valve automatically to limit the minimum pressure of the said fuel gas passed by said main fluid valve to said heater.

It is a fifth object to provide such a system with such a mechanism having means on said mechanism for modulatingly controlling said separately modulated part of said fuel supply and means away from said mechanism for modulatingly controlling in response to a condition the means on said mechanism for modulatingly controlling said separately modulated part of said fuel supply.

It is a sixth object to provide such a system with such a mechanism having valve means and valve seat means thereon cooperable to modulate said separately modulated part of said fluid supply in response to a condition together with manual means for moving one of said valve means or valve seat means relative to the other of said valve means or valve seat means to determine a value of said condition at which said valve means will close on said valve seat means in response to said condition.

It is a seventh object to provide such a system with means including a fluid filled bellows means variable in one dimension in response to a condition for automatically moving one of said valve means or valve seat means relative to the other of said valve means or valve seat means to contact said valve means on said valve seat means at a pre-set value of said condition.

It is an eighth object to provide such a system with electrically modulated valve means for controlling the separately modulated part of said fluid supply and means including a fluid filled bellows means variable in one dimension in response to a condition for automatically controlling the electricity supply to said electrically modulated valve means.

It is a ninth object to provide such a system with means including a valve means for separately modulating said separately modulated part of said fluid supply, biasing means for biasing said valve means toward the open position thereof, electric wire means strained longitudinally to restrain said biasing means, means including an electric source and a variable resistor in a circuit with said electric wire means and means including a fluid filled bellows means for varying the resistance of said resistor in response to a condition to vary the current through said electric wire to vary the temperature of the electric wire to vary the length of the electric wire to modulate the opening of the valve means.

It is a tenth object to provide such a system having a modulating main valve for a fluid supply for a variable fluid load, means operable by a separately modulated part of said fluid supply to modulate the main valve, electrically operated hot wire means for modulating said separately modulated part of said fluid supply and a modulating thermostat remote from said hot wire means for modulating the current supply to the hot wire means in response to a condition.

It is an eleventh object to provide such a system with such a hot wire modulating means and such a thermostat including a cover, a cup shaped hollow partially liquid filled bellows sealed at its open end in metallic contact with the inner face of the shell and with the liquid of said fill being in contact with the inner face of said shell together with means movable by the end of said bellows away from the shell in response to the temperature change of the shell to modulate the electric current supplied to said hot wire means.

It is a twelfth object to provide such a system with a thermostat having a circuit adapted to be connected in series by external conductors with said hot wire and a source of electric power and including in series within the thermostat a variable resistor positioned within said shell away from the bellows, another resistor within said shell adjacent the end of said bellows away from the shell and means adapting said bellows to vary the resistance of said variable resistor in response to the temperatures variation of the shell of the thermostat.

How these and other objects are attained is explained in the following description referring to the attached drawings in which Fig. 1 is a vertical sectional view of the main valve and control valve mechanism of this invention viewed along the line 1—1 of Fig. 2.

Like reference numerals refer to like parts in the several figures of the drawings.

Figure 1:
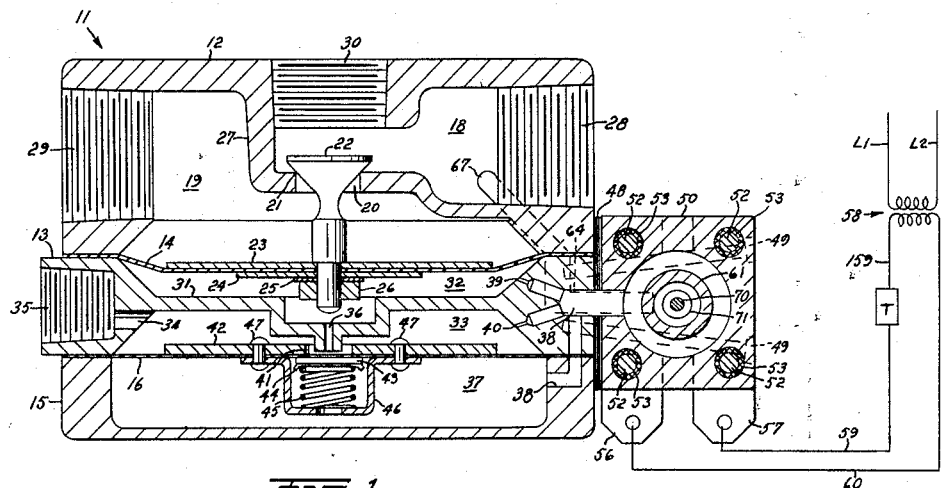
Figure 2:
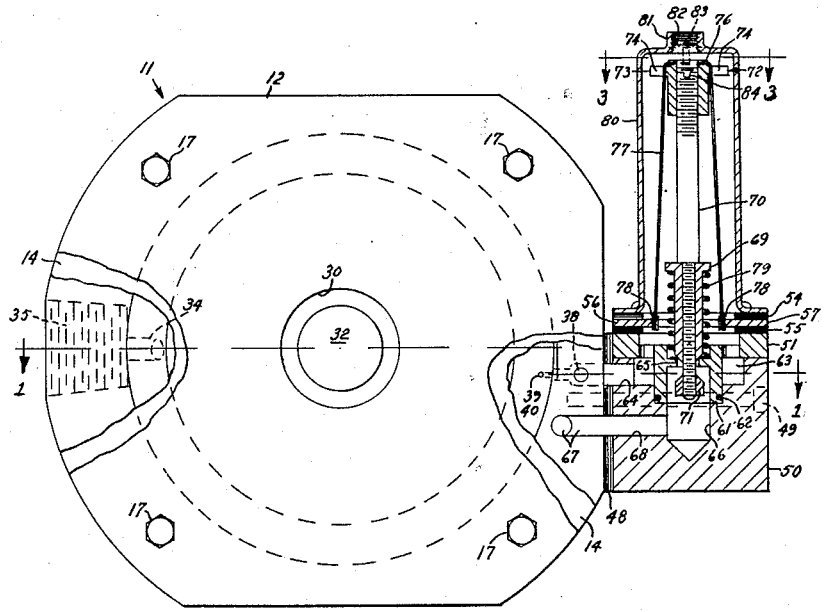
Fig. 2 is a top plan view in partial section of the main and control valve mechanisms of Fig. 1.

Referring now to the drawings, shown generally as 11 in Figs. 1 and 2 is a modulating type of control valve mechanism having a hollow body made of three parts, an upper part 12 separated from a middle part 13 by a flexible diaphragm 14 and a lower part 15 separated from part 13 by a second flexible diaphragm 16. Screws 17 hold the parts and diaphragms in assembly.

Transverse barrier 27 in part 12 isolates inlet chamber 18 and together with baffle 14 isolates outlet chamber 19. Main valve port 20 finished on its inlet side with main valve seat 21 connects inlet chamber 18 with outlet chamber 19. Main valve 22 secured to diaphragm 14 by disks 23, 24, washer 25 and nut 26, as shown, is gravitationally biased toward its position of closure on valve seat 21. The main fluid flow from its supply to its load is through inlet opening 28, inlet chamber 18, valve port 20, outlet chamber 19 and outlet opening 29. Opening 30 from chamber 18 is a construction opening and is normally plugged.

Transverse barrier 31 in part 13 with diaphragm 14 isolates control chamber 32 and with diaphragm 16 isolates exhaust chamber 33 open to atmosphere through channel 34 and exhaust opening 35. Exhaust port 36 through barrier 31 connects control chamber 32 with exhaust chamber 33.

Diaphragm 16 isolates control antechamber 37 in body part 15 although control antechamber 37 is extended into body part 13 by channel 38 as will be referred to later. Channel 38 connects with chambers 32 and 33 through restricted orifice ports 39 and 40 respectively.

Exhaust port 41 formed through diaphragm 16 and disk 42 connects control antechamber 37 with exhaust chamber 33. Exhaust valve disk 43 supported on spring cup 44 as shown is biased toward its position of closure on diaphragm 16 to close port 41 by spring 45 supported on stirrup 46 secured to diaphragm 16 and disk 42 by rivets 47. Exhaust valve disk 43 is seen to be gravitationally biased away from its position of closure over the lower end of exhaust port 36 in barrier 31 by weighted diaphragm 16.

Figure 3:
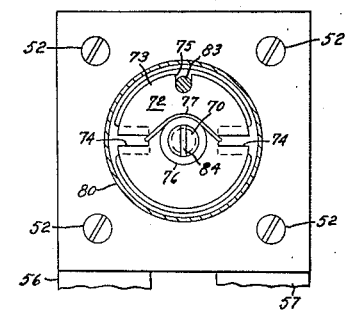
Fig. 3 is an elevation in partial section along the line 3—3 of Fig. 2.

Now referring to Figs. 1, 2 and 3, there is seen sealed to body parts 12, 13 and 14 by gasket 48 and secured by screws 49 a control valve body formed of parts 50 and 51 secured together by screws 52 electrically insulated from part 51 by tubes 53. Individually electrically insulated by tubes 53 and sheets 54, 55 and secured to body part 51 by screws 52 are electric terminal strips 56, 57 to be connected in series by wires 59, 60 with an electric power source L, L2 through a transformer 58 and the space thermostat T shown in detail in Figs. 4, 5 and 6.

Control valve body part 50 is seen to have a three step hole sunk therein with the intermediate step having control valve seat block 61 slidably sealed therein by O-ring 62. Valve seat block 61 is shown as a part of body part 51. The open end step 63 of the three step hole in block 61 is connected by lateral opening 64 and channel 38 to control antechamber 37 to form a further extension thereof connected through the hollow interior of body part 51 with one end of control valve port 65 formed axially through valve seat block 61 the other end of which opens into the smallest diameter closed end step 66 of the three step hole in body part 50.

Main valve inlet chamber 18 is seen to be connected to control antechamber 37 by channel 67 through main valve body parts 12, 13, channel 68 in control valve body part 50, hole part 66 in part 50, control valve port 65 in valve seat block 61, the interior of control body part 51, hole part 63 and channel 64 in part 50 and channel 38. Thus control antechamber 37, channel 38 and hole part 63 are continuously subjected to the main line fluid pressure from inlet chamber 18 as throttled through control valve port 65 connected with chamber 18 by channels 67, 68 and hole 66.

Gas burners with which the present system is designed to be used are designed to operate at maximum capacity at a specified maximum pressure of, say, 3.5 inches w.c. and will operate reliably at about one fifth of maximum capacity. Since the flow of gas to the burner is proportional to the square root of the pressure the minimum pressure at which the burner should be operated would be one twenty-fifth of 3.5 or .14 inches w.c.

In order to insure a sufficient operating pressure at the customer's installation as the load on the gas supply system varies the utility company maintains a gas pressure on the customer's service of, say, 7 inches w.c. which pressure is usually reduced on the customer's premises by a pressure regulator and maintained at about the rated maximum pressure of the burner (about 3.5 inches w.c.).

The present main valve control mechanism is designed to limit the modulation pressure range of gas supplied to a burner within specified operating limits, i.e., .14 to 3.5 inches w.c., and between these limits to modulate the gas pressure at the burner to the heat required to be supplied by the burner.

Thus assuming that the burner pilot light safety equipment is in good order and the pilot light is in condition to ignite any gas going to the burner from outlet chamber 19 and that control port 65 is being opened by mechanism responsive to a call for heat at the burner, gas at inlet chamber pressure flows to control antechamber 37, 38 and through restricted orifices 39, 40 into control chamber 32 and exhaust chamber 33. Orifice 40 is a continuous bleed restriction since in normal operation chambers 32 and 37 are dead ended and if there were no bleed orifice 40 and if control port 65 were suddenly closed due to a fulfillment of the need for any heat, or an emergency condition, valve 22 would be maintained in open or heat supply position.

With the mechanism of main valve 11 in the shut down position of Fig. 1, when the control port 65 is opened as above noted, gas under approximately inlet pressure flows from antechamber 37, 38 through orifice 40 to atmosphere and through orifice 39 and exhaust port 36 to atmosphere and continues to do so until the gas pressure in space 37 builds up to a safe starting value, diaphragm 16 being gravitationally loaded to bias exhaust valve disk 43 away from exhaust port 36 up to this pressure in space 37. When the pressure in space 37 rises to the pre-set value noted diaphragm 16 lifts exhaust valve 43 to close on port 36 and the full pressure of the gas in space 37, 38 is soon felt in space 32 to bear on the underside of diaphragm 14 to lift diaphragm 14 against its gravitational bias and lift main valve 22 off its seat 21 and allow load gas to pass to the burner through main valve port 20. It is to be noted that the operation of the main valve is reactionary or stabilized by the back pressure of outlet gas in chamber 19 on the top of diaphragm 14. Thus when more heat is required control port 65 will be opened further to increase the pressure under diaphragm 14 to lift main valve 22 further off its seat 21 and pass more gas to outlet space 19 and the load. But passing more gas to space 19 increases the reaction pressure of this gas on the top of diaphragm 14 which settles quickly and quietly to its new position required by the increase in pressure in space 32.

Should the inlet gas pressure become unusually high at a time when the burner is asked to supply all the heat it can and control valve port 65 is wide open, it is seen that the burner might operate at a dangerous rate if it were not for spring 45 biasing exhaust valve 43 against the lower end of exhaust port 41. Spring 45 is selected such that within a safe upper limit of pressure in space 37 with valve disk 43 pressed against the lower end of port 36, diaphragm 16 will be lifted off valve disk 43 and port 41 will be opened to bleed space 37 to atmosphere thus holding the control pressure in spaces 38 and 32 and therefore in space 19 within the required limit of burner pressure.

It is thus seen how, powered by gas under pressure from inlet chamber 18, valve mechanism 11 will modulate fuel gas flow to a burner in response to the restriction of opening of control port 65 and at the same time restrict the operation of the burner to within safe operating gas pressure limits.

The more elegant of the two methods shown for throttling control valve port 65 in response to a condition is shown in Figs. 1 to 6 inclusive in which a fluid fill bellows type of thermostat T designed to be remotely spaced from the burner in a space heated by the burner is used to modulate an electric current traversing an electric wire whose length is a function of its temperature and whose temperature is a function of the electric current it passes.

The hot wire modulator for control port 65 is shown in Figs. 1 to 3 to include a valve 69 threadedy secured in axial position on valve stem 70 and a safety valve 71 secured to stem 70. Internally threaded ceramic cap 72 threadedly positionable axially on the extended end of stem 70 is formed with a normally extending collar 73 formed with a pair of diametrically positioned slots 74, an additional slot 75 and a short extension 76. Electric resistance wire 77 having a relatively high thermal co-efficient of expansion is seen to be looped around extension 76 of cap 72 and extended through slots 74 to have its ends secured electrically and mechanically at 78 to terminal straps 56, 57. Making the valve stem 70 of material having the same temperature co-efficient of expansion as has wire 77 compensates the mechanism for ambient temperature change. Wire 77 is strained longitudinally by spring 79 biasing valve 69 away from its position of closure of port 65 and biasing valve 71 toward its position of closure of port 65. Note that if wire 77 should break spring 79 will close valve 71 or port 65 and shut down the flow of fuel gas to the burner.

Hot wire mechanism cover 80 has a flanged open end secured in place by screws 52 and an extended end formed with a threaded collar 81 surrounding an adjustment access hole 82 which is normally fitted with a sealing plug, not shown. Offset from collar 81 and extending inwardly from the end of cover 80 is a detent rivet 83 extending through slot 75 to prevent cap 73 from rotating. The extended end of valve stem 70 is formed with a screw driver slot 84 engageable by a screw driver extending inwardly through hole 82 in cover 20 for the purpose of rotating valve stem 70 in cap 73 manually to position valve 69 at a desired position with respect to port 65 at a selected current through wire 77. It is seen that after calibration as desired the hot wire mechanism shown will position valve 69 with respect to port 65 and control the main valve mechanism to modulate the flow of fuel gas to the burner in response to the temperature of wire 77, the temperature of wire 77 being modulatingly controlled in response to the space heated by the burner by thermostat T positioned in the control electric circuit, as shown in Fig. 1, between wires 59 and 159 and shown in essential detail in Figs. 4, 5 and 6.

Thermometer T is shown with an insulating wall mounting base 85 having holes, not shown, formed therethrough to receive wall mounting screws. Secured to base 85 by rivets 86 are a pair of contact straps 87, 88 to which external circuit wires 59, 159 are respectively attached by terminal screws 89, 90. Wires 59, 159 pass through hole 91 formed through base 85.

Figure 4:
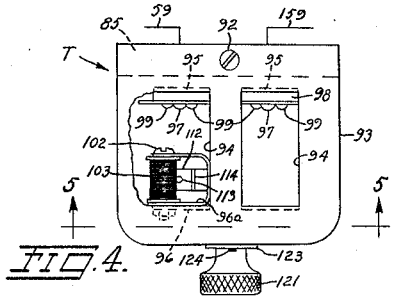
Fig. 4 is a top plan view in partial section of the modulating thermostat positioned at T in Fig. 1.
Figure 5:
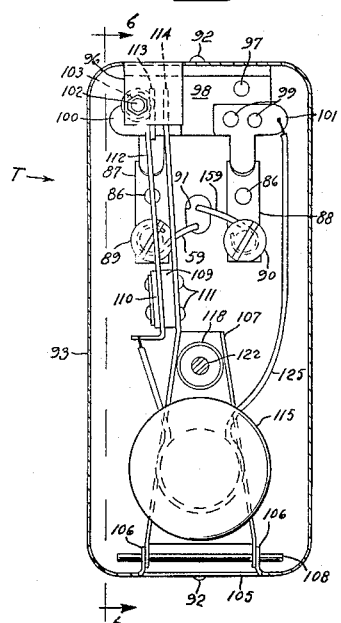
Fig. 5 is a front elevation in partial section along the line 5—5 of the thermostat of Fig. 4.
Figures 6, 7:
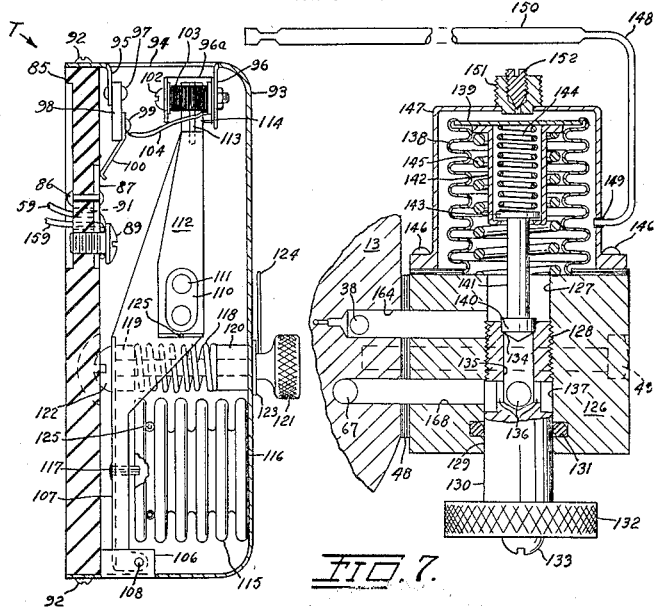
Fig. 6 is a side elevation in partial section along the line 6—6 of the thermostat of Fig. 5.
Fig. 7 is bulb and bellows type of temperature responsive modulating control valve interchangeable with the electrically operated hot wire valve shown in plan section at the right hand side of Fig. 2.

Secured to mounting base 85 by top and bottom screws 92 is thermostat cover 93 which uniquely carries all of the functional parts of the thermostat. As shown in Figs. 4, 5 and 6, ambient air circulation holes 94 in the top of thermostat cover 93 are formed by slitting the cover and displacing the metal to form a pair of ears 95 bent inwardly near the open side of cover 93 and an ear 96 bent inwardly near the closed front of cover 93. To ears 95, rivets 97 secure insulating board 98 to which in turn by rivets 99 spring contact clips 100, 101 are secured in spring contact respectively with contact straps 87, 88. Insulatedly secured to ear 96 by screw 102 as shown is a coil 103 of wire having a resistance, for instance, of about 80 ohms. The end of coil 103 nearest ear 96 is secured to clip 100 by wire 104 as shown.

Ambient air circulating hole 105 in the bottom of thermostat cover 93 is formed by slitting the metal, removing some and turning inwardly the flanges 106 to which lever 107 is hinged, as shown, by pin 108. Insulatedly secured to lever 107 by insulators 109, 110 and rivets 111 is flexible conducting lever 112 carrying wiping contact rod 113 in sliding contact with coil 103.

Of particular interest is U-shaped clip or bracket 96a secured by screw 102 into intimate contact with the supporting structure of coil 103 and ear 96 formed of the inwardly bent cover material displaced to form one of the holes 94 in the top of cover 93. Bracket 96a is formed to be secured around end 114 of lever 107 and shaped to limit the throw of lever 107 by bellows 115 to fix the limit positions of contact end 113 of lever 112 with respect to coil 103. Again bracket 96a as mounted is in good thermal contact with coil 103 and much of the heat generated in coil 103 is conducted directly to bracket 96a to be dissipated to the surrounding air. Bracket 96a is in edgewise contact with vertical currents of air and the heat is delivered efficiently to the air, thereby effectively promoting air circulation through the thermostat and increasing its sensitivity.

Hollow bellows 115 is soldered and sealed at its open end to the front of cover 93 as shown at 116. The closed end of bellows 115 is secured to lever 107 by an internally threaded hollow rivet 117 closed after a desired limited charge of a selected fluid is injected into the bellows. In this case a charge of ethyl chloride in sufficient quantity is used so that all of the fluid will be evaporated in the bellows at a temperature of about 100° F. Above that temperature then the increase in pressure within the bellows with respect to an increase in temperature is at a slower rate or approximately proportional to the absolute temperature. At all temperatures below this complete evaporation temperature some dew is present in the bellows and it will always be condensed or evaporated at the point of lowest temperature within the bellows. The pressure within the bellows is a function of the lowest temperature within the bellows. The sensitive surface on the bellows is the surface area of lowest temperature. The use of a limited fill is conventional and the properties for some suitable fluids are well known. Below the temperature of complete evaporation the pressure change per degree Fahrenheit at 70 degrees is approximately, .4 p.s.i. The force of bellows 115 exerted on lever 107 is opposed by compression spring 118 strained between cover 93 and lever 107 by spacers 119 and 120. Knurled nut 121 threaded on to screw 122 secured to lever 107 and spaced from the front face of cover 93 by thrust washer 123, after calibration with pointer 124 and a dial, not shown, on the front of cover 93 will determine the temperature to be held in the space to be heated.

For purposes to be explained insulated resistance wire 125 is placed in the annular groove of bellows 115 nearest its end away from cover 93 and has its ends connected to clip 101 and contact lever 112 respectively. The internal electric circuit of the thermostat T then includes in series between terminal screws 89 and 90, contact straps 87, 88, contact clips 100, 101, fixed resistor wire 125, variable resistor 103, wire 104 and contact lever 112 with sliding contact 113. External to thermostat T the circuit includes transformer 58, wires 59, 159, terminal straps 56, 57 and hot wire 77. It is seen that in normal service the electric circuit is continuously energized and always includes, in series, hot wire 77, fixed resistor 125 and variable resistor 103 whose included resistance is increased by lever 112 and contact 113 as the space to be heated warms up and bellows 115 expands on a rise in temperature. Conversely as the space to be heated cools and bellows 115 contracts sliding contact 113 is moved to decrease the included resistance of resistor 103.

Figure 8:
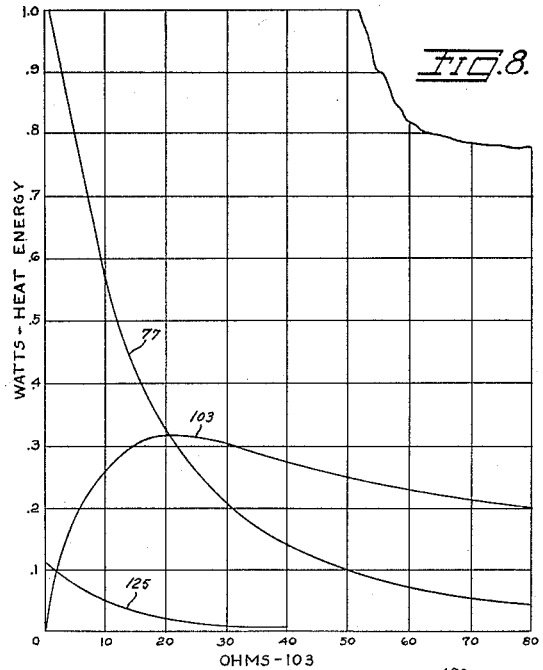
Fig. 8 is a graph showing the variation of electric heat in the two resistor elements of the thermostat and the hot wire with variation of the resistance of the variable resistor element of the thermostat.

In Fig. 8 are shown the variations of power input in watts to each of the resistances, hot wire 77, wire 125, and variable resistor 103 as the included resistance of resistor 103 is varied from 0 to approximately 80 ohms. It is seen that when resistor 103 is at its lowest included resistance or short circuited hot wire 77 is energized with about 1 watt of power to open control valve port 65 to a maximum and wire 125 applies something up to one tenth of a watt of heat to the end of bellows 115 away from cover 93. The heat dissipated by resistor 103 is mainly effective in reinforcing the ambient air convection currents through the thermostat case.

The novel construction feature of soldering the bellows 115 directly to cover 93 provides a fundamental improvement in thermostats. To serve its purpose a thermostat should respond as promptly as possible to changes in environmental temperature. The cover 93 is in direct contact with the ambient air and exposed to radiant heat exchange with the wall and furniture surfaces visible from its location. Thus the cover temperature is the best possible criterion of the comfort conditions in the room. In the construction shown the vapor contained in the bellows is in direct contact with cover 93 and, on cooling from an established equilibrium, the response is prompt for condensation takes place in the bellows on the back face of cover 93. Then the internal pressure of the bellows is proportional to the temperature of cover 93 because the other portions of the bellows structure lag in temperature drop and are at a higher temperature than cover 93.

However on a rising ambient temperature the cover temperature rises faster than the temperatures at other surfaces of the bellows structure and the most laggard or coolest surface will be the surface controlling the evaporation of bellows liquid and therefore the surface controlling the pressure in the bellows which is the force which indicates to the system the alleged temperature change of the space and which proceeds to modify the control system conditions to reduce the heat supply to the space. To compensate the system for thermostat lag I have added the fixed resistor 125 in close contact with the part of the bellows 115 away from cover 93. I call resistor 125 an accelerator resistance for it accelerates the effective response of the thermostat and causes the burner closely to follow the heating needs of the space. One way it does this is by keeping the other parts of the bellows a little warmer than the cover 93 so that the cover 93 temperature always is the temperature of condensation or evaporation of the ethyl chloride in the bellows.

Returning to the graphs of Fig. 8, the abscissae of all of the curves are the smoothly variable included values of resistance of variable resistor 103 as slider 113 progresses over the surface of resistor 103 from its wire 104 or zero resistance end to near its other end where a resistance of 80 ohms is included. Variable resistor 103, accelerator resistor 125 and hot wire resistor 77 which controls the opening of control gas orifice 65 are at all times in series with power supply transformer. As shown by the ordinate scale of the curves the several resistances as found to be satisfactory for the particular system here shown are such that when the room temperature has dropped sufficiently for slider 113 to have reduced the part of resistor 103 included in the circuit to zero then the current through the circuit will be such that the heating rate of hot wire 77 will be 1 watt and the heating rate of accelerator resistor 125 will be one tenth watt. With a heating rate of one watt hot wire 77 will elongate to allow spring 79 to lift valve 69 away from port 65 to supply sufficient control gas to space 37, 38, 32 to open valve 22 off its seat 21 to supply the burner with its rated supply of fuel gas. At this maximum burning rate of the burner it is seen that accelerator 125 will be supplying one tenth watt to the bellows to "accelerate" the thermostat's response to the fact that heat is being supplied to the space or to "anticipate" the effect on the thermostat of heat being supplied to the space as well as to require that the cover end of bellows 115 will be the cool or sensitive end even though the ambient temperature is rising. The curves show how as the space temperature rises and slider 113 moves to include more and more resistance in resistor 103 in the circuit, less heat is supplied to hot wire 77 so that less gas will be supplied to the burner and accelerator 125 also will be supplied heat at a diminishing rate as is desirable.

As above noted the heat from resistor 103 is mainly useful in improving the convection circulation of ambient air through the thermostat case but by radiation and conduction some of the heat from resistance 103 heats the thermostat generally. In the case shown this heat decreases both ways from an included resistance value of about 20 ohms in rheostat 103 which is in the normal operating range. This lessened supply of heat from rheostat 103 as the heat required moves either way from a median demand causes the thermostat to require that a little more heat be supplied to the space than is actually required. This is desirable to prevent undershooting of room temperature following by too great a supply of heat when the thermostat realizes the need for heat. However under conditions of full demand, as noted, the rheostat 103 heat falls to zero and in the absence of other heat it would be necessary for the room temperature to overshoot to satisfy the thermostat. The accelerator heat, shown by curve 125 of Fig. 8 takes care of this situation, in spite of the fact that its amount is much less than that supplied by rheostat 103 at its median resistance position, for the reason that the accelerator heat is delivered directly to the bellows with relatively high heat transfer efficiency. The net combined effect of the two sources of heat (103 and 125) when properly proportioned as shown is to anticipate and prevent delivery of excessive heat from the furnace at the "cool" end of the differential and also to anticipate and prevent a deficiency at the "warm" end. It is not possible for any of the prior art thermostat systems known to me to make these automatic adjustments which are so necessary to successful use of any type of heating control system and particularly to the use of a modulating control system.

Now taking up the modulatingly controlled control valve structure of Fig. 7, it is noted that this structure provides a completely non-electric control valve structure to be attached directly to the modulating main valve structure 11 of Figs. 1 and 2 and is particularly useful where the main control valve is in or near the space to be heated.

Note that the scale of Fig. 7 is greater than the scale to which Figs. 1 and 2 are drawn but that by removal of screws 49 control valve body parts 50, 51 and the attached control valve and operating structure can be removed from main valve body 11 and replaced by control valve body block 126 and its associated structure. Screws 49 would again be used to hold block 126 to port 13 of mechanism 11 and gasket 48 would again be used for sealing block 126 to port 13. Block 126 is formed with a hole 127 therethrough, the wall of hole 127 being threaded for a middle distance 128 and slightly enlarged for an end length 129 to pass the threaded end of control seat stem 130 and mate slidingly with the unthreaded length of stem 130 sealed therein by O-ring 131. A knurled handle disk 132 is secured by screw 133 to the end of stem 130 for manual use in rotating stem 130 axially to position control valve seat 134 formed around the open end of passageway 135 connected by radial holes 136 with annular groove 137 formed around stem 130 as shown. Channel 168 in block 126 connects channel 67 in body part 13 with annular groove 137 around stem 130. Channel 164 in block 126 connects channel 38 with hole 127 sealed at its open end by bellows 138 one end of which is sealed closed by end plate 139. Control valve 140 on stem 141 is dropped through a hole in the closed end of spring cup 142, stopped by head 143 on the other end of stem 141 and yieldingly secured in axial position by relief spring 144. Spring 145 strained between block 126 and the base flange formed on the open end of cup 142 holds the flanged end of cup 142 securely in place against end plate 139 of bellows 138.

Screws 146 secure bellows cup 147 and bellows 138 to block 126 and seal bellows cup 147 to bellows 138. Extended tube 148 sealed into cup 147 at 149 connects the interior of cup 147 with hollow tube enlargement 150 located in the space whose temperature is controlled. Externally and internally threaded fitting 151 secured into cup 147 is used for filling the tubes 148, 150 and the interspaces between bellows 138 and cup 147 with liquid ethyl ether or some other suitable liquid and the fitting is then plugged with valve plug 152.

It is seen that since the volume of tube 150 is great compared with the total volume of capillary tube 148 and the interspace between bellows 138 and cup 147 and since tube 150 is in the space whose temperature is responsive to operation of the burner supplied by fuel gas through valve mechanism 11 controlled by valve 140, 134 modulated by the interspace pressure between bellows 138 and 147, which pressure is varied by the continuous expansion or contraction of ethyl ether in tube 150, we have an extremely simple control system usable for the continuous modulated supply of heat to a space. The temperature to be automatically held can be selected at will by turning knob 132 manually to position valve seat 134. Or if at any time it is desired manually to shut down the burner it can be done by turning knob 132 to contact seat 134 on valve 140 and block control gas channel 135. It is seen that spring 144 will yield and prevent damage of either valve 140 or its seat 134 if either manually or automatically the attempt is made to overclose of valve 140 on its seat 134.

Having thus recited some of the objects of my invention illustrated and described two forms in which my invention may be practiced and explained their operation, I claim:

1. A control system for a fluid fuel supplied to a burner in response to a condition responsive to the fuel supplied to said burner, said system comprising a main valve hollow body formed with a main fluid inlet chamber, a main fluid outlet chamber separated from said main fluid inlet chamber by a partition formed with a main fluid valve port therethrough, a control chamber, a first flexible diaphragm separating said control chamber from said outlet chamber, a main valve, means biasing said main valve toward a position of closure of said main fluid valve port, means operatively associating said main valve with said diaphragm modulatingly to position said main valve with respect to said main valve port as a function of the excess of fluid pressure in said control chamber over the fluid pressure in said main fluid outlet chamber, means forming a control antechamber, means forming a pilot fluid conduit connecting said main fluid inlet chamber with said control antechamber, pilot valve means in said pilot fluid conduit responsive to said condition means forming a restricted fluid conduit connecting said control antechamber with said control chamber, means forming an exhaust chamber open to atmosphere, a second flexible diaphragm between said exhaust chamber from said antechamber, means forming a first exhaust port connecting said control chamber with said exhaust chamber, means forming a second exhaust port connecting said control antechamber to said exhaust chamber, a first exhaust valve, a second exhaust valve, means biasing said first exhaust valve away from its position of closure of said first exhaust port, means biasing said second exhaust valve toward its position of closure of said second exhaust port, said second diaphragm being responsive to the fluid pressure in said control antechamber overlappingly to operate said fluid pressure limiting exhaust valve means to close said first exhaust valve on said first exhaust port at a first preset value of fluid pressure in said antechamber and to open said second exhaust valve from said second exhaust port at a second pre-set value of fluid pressure in said antechamber higher than said first pre-set value.

2. A control system for fuel gas supplied from a source of said gas to a heating load in inverse response to a condition responsive to the supply of said fuel gas to said heating load, said system including a fuel gas conduit for supplying fuel gas from said fuel gas source to said heating load, said fuel gas conduit including a fuel gas valve movable in said conduit to modulate the passageway for fuel gas therethrough between a no flow position and a full flow position, means biasing the said fuel gas valve towards the closed position thereof, diaphragm means differentially responsive to the pressure on one side thereof of fuel gas supplied to said load through said fuel gas conduit to bias said fuel gas valve toward its closed position and controlled gas pressure on the other side thereof to bias said fuel gas valve towards its open position, a source of control gas under pressure, means forming a controlled gas chamber, control gas conduit means for conducting control gas from said source of control gas to said controlled gas chamber, said control gas conduit means including control valve means operable between a closed position and a full open position of said control gas conduit, a first restricted passage conduit means connecting said controlled gas chamber with the other side of said diaphragm, a second restricted passage conduit means continuously connecting said controlled gas chamber with the atmosphere, an exhaust valve connecting said controlled gas chamber with the atmosphere, means biasing said exhaust valve towards the open position thereof, means responsive to a preset pressure in said controlled gas chamber for closing said exhaust valve and means responsive to the variation in said condition to modulate the position of said control valve means.

References Cited in the file of this patent

UNITED STATES PATENTS

| Number | Name | Date |
|---|---|---|
| 680,423 | Winkenwerder | Aug. 13, 1901 |
| 896,587 | Saugstad | Aug. 18, 1908 |
| 1,347,689 | Fitts | July 27, 1920 |
| 1,837,086 | Von Schutz | Dec. 15, 1931 |
| 1,987,032 | Spence | Jan. 8, 1935 |
| 1,993,687 | Shivers | Mar. 5, 1935 |
| 1,994,771 | Knopp | Mar. 19, 1935 |
| 2,041,050 | Cunningham | May 19, 1936 |
| 2,062,437 | Abbott et al. | Dec. 1, 1936 |
| 2,200,318 | Yonkers | May 14, 1940 |
| 2,226,865 | Kirchoff | Dec. 31, 1940 |
| 2,261,343 | DeFlorez et al. | Nov. 4, 1941 |
| 2,291,504 | Persons | July 28, 1942 |
| 2,312,251 | Johnson | Feb. 23, 1943 |
| 2,362,631 | Harris | Nov. 14, 1944 |
| 2,396,541 | Taylor | Mar. 12, 1946 |
| 2,512,548 | Kysor | June 20, 1950 |
| 2,524,377 | Cunningham | Oct. 3, 1950 |
| 2,593,557 | Hamilton | Apr. 22, 1952 |
| 2,798,689 | Houghton | July 9, 1957 |
| 2,805,039 | Angelery | Sept. 3, 1957 |
| 2,812,909 | Dalton | Nov. 12, 1957 |